Feb. 5, 1952 M. A. GONZALEZ FABIA ET AL 2,584,686
CYCLONE FURNACE WITH SEPARATED COMBUSTION
AND HEAT EXCHANGE CHAMBERS
Filed April 27, 1946 3 Sheets-Sheet 1
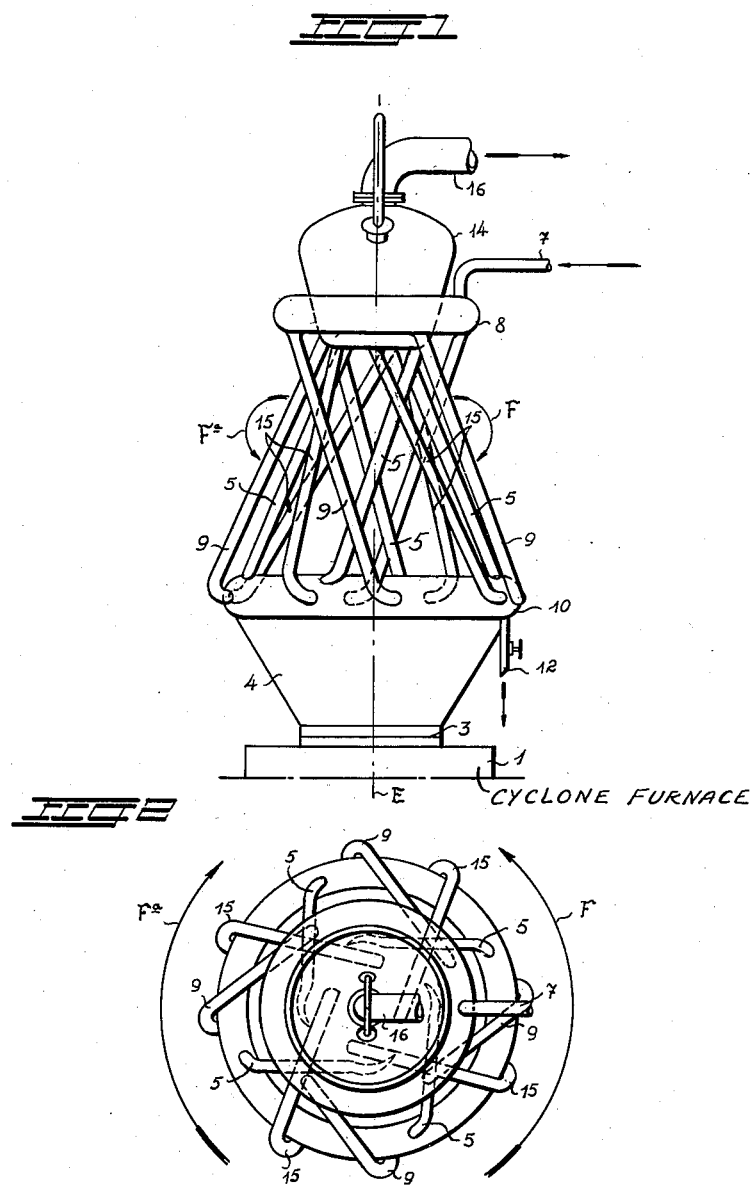

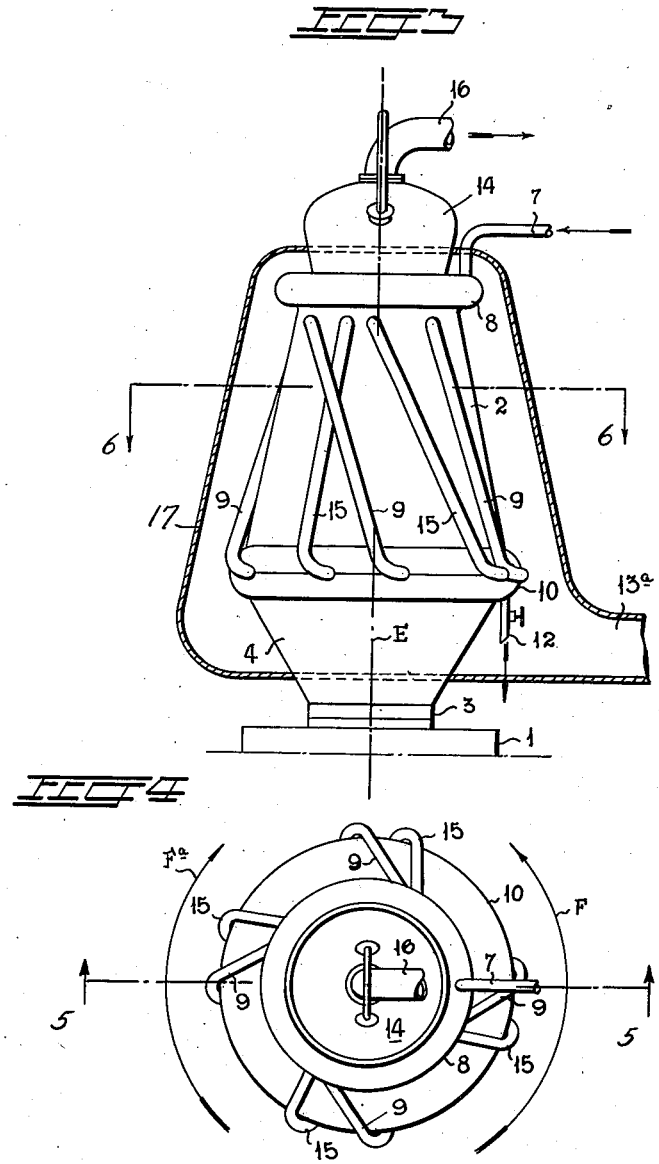

Feb. 5, 1952  M. A. GONZALEZ FABIA ET AL  2,584,686
CYCLONE FURNACE WITH SEPARATED COMBUSTION
AND HEAT EXCHANGE CHAMBERS
Filed April 27, 1946  3 Sheets-Sheet 3
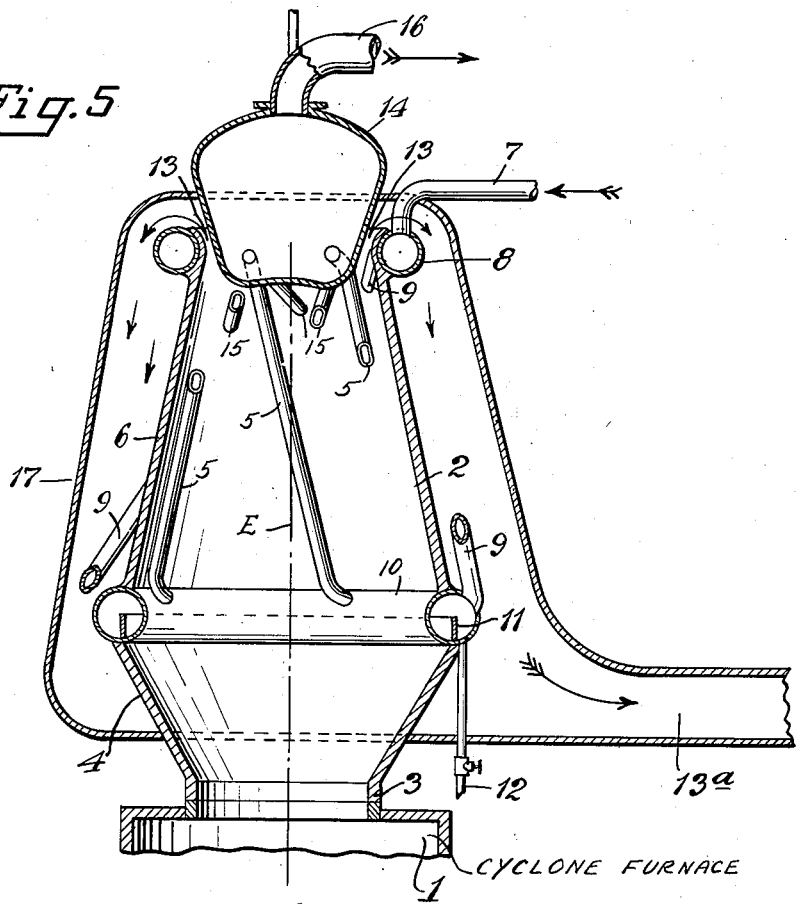
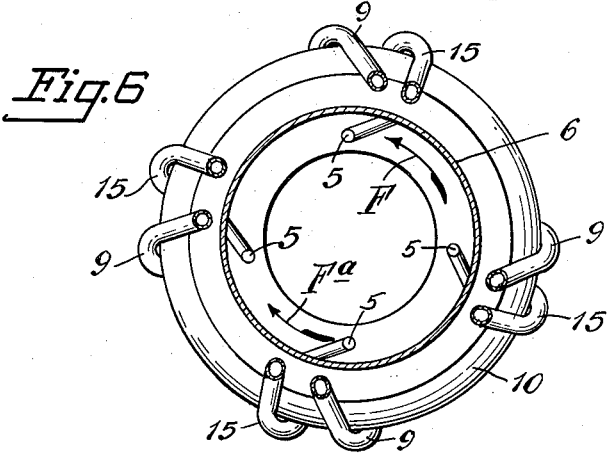
Inventors
Heriberto Enrique Guillermo Juan Clausen
Manuel Andres Gonzales Fabia
by Singer, Ehlert, Stern & Carlberg
Attorneys.

Patented Feb. 5, 1952

2,584,686

UNITED STATES PATENT OFFICE 2,584,686

CYCLONE FURNACE WITH SEPARATED COMBUSTION AND HEAT EXCHANGE CHAMBERS

Manuel Andres Gonzalez Fabia and Heriberto Enrique Guillermo Juan Clausen, Buenos Aires, Argentina, assignors to Tecnica Industrial y Comercial Sociedad Anonima Tecosa, Buenos Aires, Argentina Application April 27, 1946, Serial No. 665,598
In Brazil April 30, 1945

1 Claim. (Cl. 122—7)

The present invention refers to a cyclone furnace employing a new method for generating, exchanging and utilizing heat.

While the invention refers more generally to improved means for producing steam, it may also be employed in primary and reconstructive distillation, so called cracking, and polymerization of oil, gas, and alcohol.

Boilers and stills of various designs and types used at present in the above mentioned arts suffer in a larger or lesser degree under the inconvenience that a perfect combustion of the fuel is not obtainable.

It is now the principal object of the invention to provide means in which all factors that prevent or hinder a perfect combustion of the fuel are eliminated. According to the invention the combustion takes place within a special combustion chamber from which the incandescent gases are passed through a restricted conduit into a heat exchange chamber where are located the tubular elements or the containers through which the fluid to be heated flows or is contained, respectively.

Another object of the invention is to conduct the residual gases from the combustion chamber to the heat exchange chamber through a conduit of such a size as to maintain a pressure higher than the atmospheric pressure, and at a given excess pressure in the first, relative to the second. This arrangement assures a complete separation of both chambers. In the combustion chamber a high temperature is required as well as an intimate and long contact between the oxygen of the air and the fuel molecules. The higher pressure in the combustion chamber favors the oxygen-fuel contact indispensable for a complete combustion, and also increases the concentration of heat.

The combustion heat is thus released very rapidly in a small space, the residual gases acquiring thereby a very high temperature, i. e. in optimum conditions for the transmission of heat by radiation.

It is another object of the invention to provide the heat exchange chamber with inner walls conforming to a rotation generated surface the axis of which coincides with the axis of the circular conduit through which enter the residual incandescent gases expelled from the combustion chamber. The tubes through which circulates the fluid to be heated, are placed parallel and near said inner walls and preferably extend lengthwise of the same and are shaped spirally. A perfect radiating chamber is thus obtained as far as uniformity of heat distribution is concerned.

The inner walls of the chamber act as radiation surfaces, and the tubes absorbing the heat, are placed in a circle surrounding the heat focus constituted by the jet of incandescent gases. Thus, maximum advantage can be taken of said focus of radiant heat, with reduced heat absorbing surfaces, and without the risk of local overheating that would either damage the refractory material or the tubes. High peripheral speed is thus imparted to the gases within the heat exchange chamber, and as the tubes are placed at said periphery an active transmission of heat by convection is attained.

The following is a description of a steam boiler based on the new principles of the present invention, complemented by the annexed drawings, to which reference is made, and in which:

Fig. 1 is a view in elevation of the outside of the boiler, omitting the refractory lining of the heat exchange chamber;

Fig. 2 is a plan projection of the boiler shown in Fig. 1;

Fig. 3 is an elevational view of the steam boiler including the refractory lining with the outer casing shown in section;

Fig. 4 is a plan projection of the boiler shown in Fig. 3 with the outer casing removed;

Fig. 5 is a sectional view taken on the line 5—5 of Fig. 4.

Fig. 6 is a plan in cross-section on the line 6—6 of Fig. 3. The combustion takes place in the special "combustion chamber" which makes it possible to effect the first fundamental step of the process in a perfect manner. The incandescent gases pass from the combustion chamber 1 into the heat exchange chamber 2 through conduit 3, which is of such a size as to maintain a given excess-pressure in the first chamber 1 in relation to the second. Conduit 3, which constitutes a cyclonizing collar, leads the gases to communicating conduit 4 (turbulent diffuser), from which the gases expand into the heat exchange chamber 2 (turbulent heater), where the tubular elements 5 are located and through which flows the water used in this particular application of the invention.

The arrangement of chambers 1 (turbulent burner) and 2 (turbulent heater) assures a complete separation of the two steps so that in each of said chambers the respective processes, of different nature, are developed. In the combustion chamber 1 (turbulent-burner) high temperature is obtained, as well as an intimate and extended contact of the oxygen of the air with the molecules of the fuel. There are no heat losses; all the combustion heat remains concentrated in the residual gases.

A preferred form of turbulent burner which may be used as disclosed and claimed in the U. S. Patent No. 2,395,103, granted February 19, 1946.

No oxygen or carbon monoxide (CO) will be found in the residual gases produced by the excess of air, since the exact volume of air, corresponding to the volume and quality of the fuel employed, may be introduced in the combustion chamber (turbulent burner).

The higher pressure in the combustion chamber 1 enhances the contact between the oxygen and fuel that is indispensable for complete combustion, and also increases the concentration of heat in the surroundings of said chemical reaction, this being another important factor of the process. The combustion heat is thus liberated with great rapidity in a small volume, and thereby the residual gases acquire a very high temperature, i. e., optimum condition for the transmission of heat by radiation.

The heat exchange chamber 2 (turbulent-heater) has inner walls 6 forming a rotation generated surface, the axis E of which coincides with the axis of conduit 3 through which the incandescent residual gases proceeding from the combustion chamber 1 (turbulent burner) enter. Tubes 5, through which flows the water to be heated, are placed parallel to and at short distance from said inner walls. This arrangement may be effected following a generatrix or spiral line.

Chamber 2 thus obtained is capable of perfect radiation, and uniformity in distribution of heat. Both the inner walls 6 of chamber 2 that will act, in turn, as radiant surfaces, as well as the tubes 5 that absorb the heat, are arranged in a circle surrounding the heat focus constituted by the jet of incandescent gases. Complete advantage can thus be taken, to a maximum, of the heat radiant focus with reduced heat receiving surfaces and without risk of local overheating which may damage either the refractory material 6 or the material of the tubes 5.

The combustion chamber 1 (turbulent burner), the communicating conduit 4 (turbulent diffuser) and the heat exchange chamber 2 (turbulent heater) form with their inner walls 6, rotation generated surfaces with the same single axis E, so that the cyclonic motion $F^a$, generated in the combustion chamber as a result of the tangential entrance of the fuel and air into the same, is retained by the residual gases that exit through the axial conduit 3, continuing said motion in the turbulent diffuser 4 and again in the heat exchange chamber 2 (turbulent heater). The tangential entrance of the fuel and air is not shown in the drawing.

A high peripheric speed is thus imparted to the gases in the exchange chamber 2 (turbulent heater), and as a result of the peripherical distribution of the tubes 5, an active transmission of the heat by convection is achieved.

The heat absorbing tubes 5, constructed along the lines appertaining to the rotation generated surface, coaxial with the chamber, are preferably curved at their ends in inverted sense F to that of the cyclonic rotation of the gases $F^a$.

Thus a higher convection speed is secured in the exchange chamber 2 (turbulent-heater), between gases and tubes.

The axis of symmetry and rotation E, common to both chambers 1 and 2, and the intercommunicating conduit 3, may be positioned either in the vertical or horizontal position or again inclined at any desired angle, according to the requirements of the installations; however, the vertical position is preferred whenever possible. In this case the combustion chamber 1 (turbulent burner) may be positioned under the exchange chamber 2 (turbulent heater) expelling the combustion gases up through the axial conduit or vice versa.

*Operation of the system for the production of steam*

The entrance of water 7, leads to an upper collector 8, Figs. 1 to 5, separated from the turbulent heater 2, Figs. 3 and 5, by the refractory lining 6, Fig. 5, and is communicated through pipes 9 with a lower collector 10, Figs. 1 to 6, arranged within the turbulent heater 2 and subjected, consequently, to the direct action of the incandescent gases which pass successively from the turbulent burner 1, through conduit 3 (cyclonizing ring) and the turbulent diffuser 4 up to the turbulent-heater 2, where the tubular elements are located.

Circulation of the water by gravity is started from collector 8 to collector 10 through the pipes 9 placed outside of the action of the turbulent-heater (external portion; see Fig. 5).

Lower collector 10 has in its interior a circular baffle 11, Fig. 5, against which the water strikes that enters tangentially through the pipes 9, facilitating the settlement of foreign matter from the liquid, which is expelled, if necessary, through the discharge 12 (purge).

The descent of the water is started with a cyclonic motion F since upon entering collector 8 through entrance 7; it leaves this collector through the said tubes 9 the openings of which establish with the collector tangential contact, same as in its union with the lower collector 10. Thus, the water and the conducting tubes follow the direction of rotation F, Figs. 4 and 6.

The fundamental process of the combustion is started in the turbulent burner 1, the combined tangential admission of fuel and air having been carefully regulated.

The ideal combustion temperature is established as well as the required intimate contact between fuel and oxygen, and the pressure and turbulence indispensable for effecting a perfect combustion.

The latter process is based completely on this novel system because, as stated above, the cyclonic motion of the gases $F^a$ initiated within the turbulent-burner 1, in inverse sense to that of the water F, continues and increases through conduit 3, (cyclonizing collar), the turbulent-diffuser 4 and the turbulent-heater 2, up to the exit opening 13 of said gases, Fig. 5, which are discharged through passage $13^a$ provided by the housing 17.

The collector 10, being subjected to the direct action of the incandescent gases, the water contained therein is evaporated and rises towards the turbulent-vaporizer 14, through the tubes 5 arranged inside the turbulent-heater the tangential contacts of which with collector 10 and with turbulent vaporizer 14 facilitate the continuation of the cyclonic motion of the water started when descending from collector 8 to collector 10, and continued until its vaporization and exit through conduit 16.

The water that does not go through the complete vaporizing process, or which is condensed in the turbulent vaporizer, returns to the lower collector 10 through tubes 15 also placed outside of the action of the turbulent-heater, Fig. 6, and likewise by tangential contact with collector 10 establishes the continuity of the process.

From the foregoing specification and the annexed drawings, it will be apparent to those skilled in the art that, on carrying the present invention into practice, minor variations may be introduced as regards the structural form and functional relation of the components of the arrangement, without departing from the spirit and scope of this invention as clearly defined in the appended claim.

We claim:

In a cyclone furnace, the combination comprising a longitudinally extending conical heat exchange chamber and a combustion chamber provided with a restricted axial discharge conduit to maintain a given excess pressure in the combustion chamber in relation to the heat exchange chamber, said conical heat exchange chamber being arranged in axial alignment with said combustion chamber, a conical turbulent diffuser connecting said restricted axial discharge conduit with said heat exchange chamber, said diffuser and heat exchange chamber being of a size to cause an expansion of the products of combustion entering the same, an annular liquid collector at the admission end of the heat exchange chamber, a vaporizer for liquid arranged in the discharge end of the heat exchange chamber so as to form an annular discharge opening and restrict the discharge opening of the same, and a plurality of heat absorbing tubes inclined to the axis of the heat exchanger and arranged in said heat exchange chamber spaced from the conical wall thereof and parallel thereto and extending substantially spirally lengthwise thereof and connecting said annular liquid collector with said vaporizer.

MANUEL ANDRES GONZALEZ FABIA.
HERIBERTO ENRIQUE GUILLERMO
JUAN CLAUSEN.

REFERENCES CITED

The following references are of record in the file of this patent:

UNITED STATES PATENTS

| Number | Name | Date |
|---|---|---|
| 699,838 | Moore | May 13, 1902 |
| 882,959 | Penney | Mar. 24, 1908 |
| 907,863 | Norris | Dec. 29, 1908 |
| 1,125,758 | Stack | Jan. 19, 1915 |
| 1,300,087 | Wood | Apr. 8, 1919 |
| 1,591,679 | Hawley | July 6, 1926 |
| 1,910,735 | Zikesch | May 23, 1933 |
| 1,998,329 | Mechelke | Apr. 16, 1935 |
| 2,264,226 | Toner | Nov. 25, 1941 |
| 2,357,301 | Bailey et al. | Sept. 5, 1944 |